US012367891B2

(12) United States Patent
Robben et al.

(10) Patent No.: US 12,367,891 B2
(45) Date of Patent: Jul. 22, 2025

(54) AUDIO SIGNAL PROCESSING METHOD AND SYSTEM FOR CORRECTING A SPECTRAL SHAPE OF A VOICE SIGNAL MEASURED BY A SENSOR IN AN EAR CANAL OF A USER

(71) Applicant: Analog Devices International Unlimited Company, Limerick (IE)

(72) Inventors: Stijn Robben, Boutersem (BE); Abdel Yussef Hussenbocus, Heverlee (BE)

(73) Assignee: Analog Devices International Unlimited Company, Limerick (IE)

( * ) Notice: Subject to any disclaimer, the term of this patent is extended or adjusted under 35 U.S.C. 154(b) by 294 days.

(21) Appl. No.: 17/847,883

(22) Filed: Jun. 23, 2022

(65) Prior Publication Data

US 2023/0419981 A1 Dec. 28, 2023

(51) Int. Cl.
*G10L 21/0324* (2013.01)
*G10L 25/18* (2013.01)
*G10L 25/78* (2013.01)

(52) U.S. Cl.
CPC .......... *G10L 21/0324* (2013.01); *G10L 25/18* (2013.01); *G10L 25/78* (2013.01)

(58) Field of Classification Search
CPC ..... G10L 21/0324; G10L 25/18; G10L 25/78; H04R 1/1083; H04R 25/305; H04R 29/001; H04R 1/1041
See application file for complete search history.

(56) References Cited

U.S. PATENT DOCUMENTS

2013/0022223 A1* 1/2013 Kehtarnavaz ........ A61N 1/0541 381/317
2015/0348562 A1* 12/2015 Krishnaswamy ... G10L 21/0264 704/206

(Continued)

FOREIGN PATENT DOCUMENTS

EP 3089475 A1 11/2016
EP 3742756 A1 11/2020
WO WO-2023247710 A1 12/2023

OTHER PUBLICATIONS

Stone et al. "A Technique for Estimating the Occlusion Effect for Frequencies Below 123 Hz", National Library of Medicine (Year: 2015).*

(Continued)

*Primary Examiner* — Hai Phan
*Assistant Examiner* — Ian Scott McLean
(74) *Attorney, Agent, or Firm* — Schwegman Lundberg & Woessner, P.A.

(57) ABSTRACT

The present disclosure relates to an audio signal processing method implemented by an audio system which includes at least an internal sensor, wherein the internal sensor is located in an ear canal of a user of the audio system and arranged to measure acoustic signals which propagate internally to a head of the user. The audio signal processing method includes: producing an internal audio signal by the internal sensor; determining an audio spectrum of the internal audio signal; determining a spectral center of the audio spectrum; determining a spectrum shape correction filter based on the spectral center; and filtering the internal audio signal by using the spectrum shape correction filter, thereby producing a filtered internal audio signal.

20 Claims, 3 Drawing Sheets

(56) References Cited

U.S. PATENT DOCUMENTS

| | | | | |
|---|---|---|---|---|
| 2020/0374617 | A1* | 11/2020 | Liu | H04R 3/04 |
| 2023/0317100 | A1* | 10/2023 | Yang | G10L 15/02 704/233 |

OTHER PUBLICATIONS

"International Application Serial No. PCT/EP2023/066996, International Search Report mailed Sep. 27, 2023", 4 pgs.

"International Application Serial No. PCT/EP2023/066996, Written Opinion mailed Sep. 27, 2023", 5 pgs.

"International Application Serial No. PCT/EP2023/066996, International Preliminary Report on Patentability mailed Jan. 2, 2025", 7 pgs.

* cited by examiner

AUDIO SIGNAL PROCESSING METHOD AND SYSTEM FOR CORRECTING A SPECTRAL SHAPE OF A VOICE SIGNAL MEASURED BY A SENSOR IN AN EAR CANAL OF A USER

BACKGROUND OF THE INVENTION

Field of the Invention

The present disclosure relates to audio signal processing and relates more specifically to a method and computing system for correcting a spectral shape of a voice signal measured by an audio sensor located inside an ear canal of a user of the audio system.

The present disclosure finds an advantageous application, although in no way limiting, in wearable devices such as earbuds or earphones or smart glasses used to pick-up voice for a voice call established using any voice communication system.

Description of the Related Art

To improve picking up a user's voice signal in noisy environments, wearable devices like earbuds or earphones are typically equipped with different types of audio sensors such as microphones and/or accelerometers.

These audio sensors are usually positioned such that at least one audio sensor, referred to as external sensor, picks up mainly air-conducted voice and such that at least another audio sensor, referred to as internal sensor, picks up mainly bone-conducted voice. Compared to an external sensor, an internal sensor picks up the user's voice with less ambient noise but with a limited spectral bandwidth (mainly low frequencies), such that the bone-conducted voice provided by the internal sensor can be used to enhance the air-conducted voice provided by the external sensor, and vice versa.

External sensors are usually air conduction sensors (e.g. microphones), while internal sensors can be either air conduction sensors or bone conduction sensors (e.g. accelerometers).

Voice signals measured by a bone conduction sensor are usually unaffected by the fit of an earbud, wherein a tight fit corresponds to substantially no gap between the earbud and the user's ear while a loose fit corresponds to the presence of a gap between the earbud and the user's ear. As long as the earbud is in contact with the skin inside the ear canal, a consistent voice signal capture is obtained with minimal ambient noise leakage.

On the other hand, voice signals captured by an internal air conduction sensor are affected by the fit of the earbud. In particular, a loose fit will usually result in a reduction in the low frequency (below ~600 Hertz) components due to less occlusion effect. A loose fit may also result in a boost in the mid frequency (in the range of around 600 Hertz to 1500 Hertz) components due to more resonance in the ear canal and due to increased ambient noise leakage.

The use of an active Noise Cancellation (ANC) unit may also affect voice signals captured by an internal air conduction sensor, especially in the case of a feedback ANC unit. More specifically, the use of an ANC unit causes a reduction in the low frequency components of voice signals captured by an internal air conduction sensor, thereby reducing the occlusion effect.

In some existing solutions, audio signals from an internal sensor and an external sensor are mixed together for mitigating noise, by using the audio signal provided by the internal sensor mainly for low frequencies while using the audio signal provided by the external sensor for higher frequencies. However, in the case of loose fitting of the earbud or with an active ANC unit, the reduction of the low frequency components and/or the boost of the mid frequency components of the audio signal provided by the internal sensor eventually results in an inconsistent sounding voice in the output signal.

Audio signals from internal sensors may also be used for purposes other than mixing with audio signals from e.g. external sensors. For instance, audio signals from internal sensors may be used for voice activity detection (VAD), speech level estimation, speech recognition, etc., which are also affected by loose fitting of the earbud and/or by an active ANC unit.

SUMMARY OF THE INVENTION

The present disclosure aims at improving the situation. In particular, the present disclosure aims at overcoming at least some of the limitations of the prior art discussed above, by proposing a solution enabling to mitigate the effects on the audio signals provided by internal sensors of loose fitting of an earbud (or earphone) and/or of an active ANC unit.

For this purpose, and according to a first aspect, the present disclosure relates to an audio signal processing method implemented by an audio system which comprises at least an internal sensor, wherein the internal sensor is an air conduction sensor located in an ear canal of a user of the audio system and arranged to measure acoustic signals which propagate internally to a head of the user, wherein the audio signal processing method comprises:

- producing an internal audio signal by the internal sensor,
- determining an audio spectrum of the internal audio signal,
- determining a spectral center of the audio spectrum,
- determining a spectrum shape correction filter based on the spectral center,
- filtering the internal audio signal by using the spectrum shape correction filter, thereby producing a filtered internal audio signal.

Hence, the present disclosure proposes to perform a spectral analysis of the internal audio signal produced by the internal sensor, and more specifically to compute a spectral center of an audio spectrum of the internal audio signal. Indeed, as discussed above, the presence of a loose fit of an earbud and/or of an active ANC unit results in a reduction in low frequency components due to a reduction of the occlusion effect (and possibly also in a boost of mid frequency components). Accordingly, the presence of a reduction of the occlusion effect will result in a greater value for the spectral center compared to an expected value of the spectral center with a tight fit of the earbud and an inactive ANC unit (or no ANC unit at all). The spectral center of the audio spectrum of the internal audio signal may therefore be used to evaluate a level of the occlusion effect, since the higher the spectral center the lower the occlusion effect. Since the global effects of loose fitting and/or of an active ANC unit are known (reduction of low frequency components and possibly boost of mid frequency components), the spectral center can be used to determine a spectrum shape correction filter aiming at correcting these global effects. If the spectral center corresponds substantially to the expected value (for the case with a tight fit and an inactive ANC unit), then the spectrum shape correction filter may be e.g. an identity filter (i.e. which does not modify the shape of the audio spectrum of the internal audio signal). If the spectral center is significantly greater than said expected value, then the spectrum shape correction filter may be configured to e.g. boost the low frequency components and possibly to reduce the middle/high frequency components of the internal audio signal.

In specific embodiments, the audio signal processing method may further comprise one or more of the following optional features, considered either alone or in any technically possible combination.

In specific embodiments, the spectral center is a spectral centroid or a spectral median of the audio spectrum.

In specific embodiments, determining the spectrum shape correction filter comprises comparing the spectral center with one or more predetermined thresholds.

In specific embodiments, responsive to the spectral center being greater than at least one predetermined threshold, determining the spectrum shape correction filter comprises configuring said spectrum shape correction filter to modify the audio spectrum of the internal audio signal to reduce the spectral center of said audio spectrum.

In specific embodiments, one of the one or more predetermined thresholds is between 200 Hertz and 800 Hertz, or between 300 Hertz and 600 Hertz.

In specific embodiments, the audio signal processing method further comprises:

- evaluating a voice activity in the internal audio signal and,
- responsive to no voice activity being detected in the internal audio signal, not modifying the spectrum shape correction filter.

In specific embodiments, determining the spectrum shape correction filter comprises selecting, based on the spectral center, a spectrum shape correction filter among a plurality of predetermined different spectrum shape correction filters.

In specific embodiments:

- the internal audio signal comprises a plurality of successive audio frames,
- the spectrum shape correction filter determined by processing one or more previous audio frames of the internal audio signal is applied to a current audio frame before determining the spectral center for the current audio frame,
- the audio signal processing method further comprises determining an inverse spectrum shape correction filter of the spectrum shape correction filter determined by processing the one or more previous audio frames and filtering the current audio frame by the inverse spectrum shape correction filter before determining the spectral center for the current audio frame.

In specific embodiments, filtering the internal audio signal is performed by applying the spectrum shape correction in time domain or in frequency domain.

In specific embodiments, the audio system further comprises an external sensor arranged to measure acoustic signals which propagate externally to the user's head, and said audio signal processing method further comprises:

- producing an external audio signal by the external sensor,
- producing an output signal by combining the external audio signal with the filtered internal audio signal.

According to a second aspect, the present disclosure relates to an audio system comprising at least an internal sensor, wherein the internal sensor corresponds to an air conduction sensor to be located in an ear canal of a user of the audio system and arranged to measure acoustic signals which propagate internally to a head of the user, wherein the internal sensor is configured to produce an internal audio signal, wherein said audio system further comprises a processing circuit configured to:

- determine an audio spectrum of the internal audio signal,
- determine a spectral center of the audio spectrum,
- determine a spectrum shape correction filter based on the spectral center,
- filter the internal audio signal by using the spectrum shape correction filter, thereby producing a filtered internal audio signal.

According to a third aspect, the present disclosure relates to a non-transitory computer readable medium comprising computer readable code to be executed by an audio system comprising at least an internal sensor, wherein the internal sensor corresponds to an air conduction sensor to be located in an ear canal of a user of the audio system and arranged to measure acoustic signals which propagate internally to a head of the user, wherein said audio system further comprises a processing circuit, wherein said computer readable code causes said audio system to:

- produce an internal audio signal by the internal sensor,
- determine an audio spectrum of the internal audio signal,
- determine a spectral center of the audio spectrum,
- determine a spectrum shape correction filter based on the spectral center,
- filter the internal audio signal by using the spectrum shape correction filter, thereby producing a filtered internal audio signal.

BRIEF DESCRIPTION OF DRAWINGS

The invention will be better understood upon reading the following description, given as an example that is in no way limiting, and made in reference to the figures which show.

In these figures, references identical from one figure to another designate identical or analogous elements. For reasons of clarity, the elements shown are not to scale, unless explicitly stated otherwise.

Also, the order of steps represented in these figures is provided only for illustration purposes and is not meant to limit the present disclosure which may be applied with the same steps executed in a different order.

DESCRIPTION OF THE PREFERRED EMBODIMENTS

As indicated above, the present disclosure relates inter alia to an audio signal processing method 20 for mitigating the effects of loose fitting of an earbud (or earphone) and/or of an active ANC unit.

Figure 1:
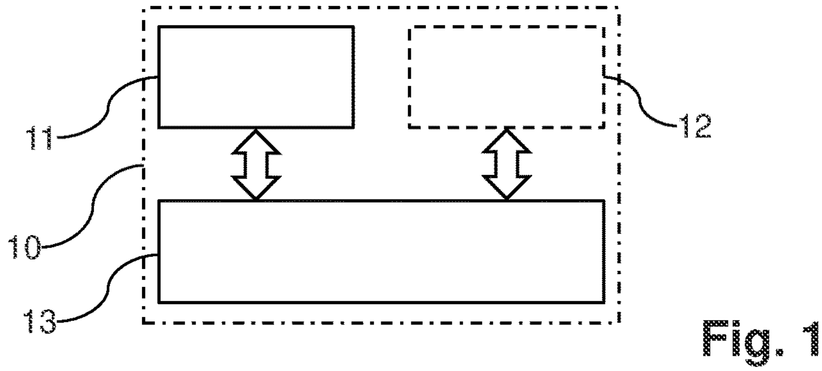
FIG. 1: a schematic representation of an exemplary embodiment of an audio system.

FIG. 1 represents schematically an exemplary embodiment of an audio system 10. In some cases, the audio system 10 is included in a device wearable by a user. In preferred embodiments, the audio system 10 is included in earbuds or in earphones or in smart glasses.

As illustrated by FIG. 1, the audio system 10 comprises at least one audio sensor configured to measure voice signals emitted by the user of the audio system 10, referred to as internal sensor 11. The internal sensor 11 is referred to as "internal" because it is arranged to measure voice signals which propagate internally through the user's head. For instance, the internal sensor 11 may be an air conduction sensor (e.g. microphone) to be located in an ear canal of a user and arranged on the wearable device towards the interior of the user's head, or a bone conduction sensor (e.g. accelerometer, vibration sensor). The internal sensor 11 may be any type of bone conduction sensor or air conduction sensor known to the skilled person.

The present disclosure finds an advantageous application, although non-limitative, to the case where the internal sensor 11 is an air conduction sensor. In the sequel, we assume in a non-limitative manner that the internal sensor 11 is an air conduction sensor, e.g. a microphone, to be located in an ear canal of a user and arranged towards the interior of the user's head.

In the non-limitative example illustrated by FIG. 1, the audio system 10 comprises another, optional, audio sensor referred to as external sensor 12. The external sensor 12 is referred to as "external" because it is arranged to measure voice signals which propagate externally to the user's head (via the air between the user's mouth and the external sensor 12). For instance, the external sensor 12 is an air conduction sensor (e.g. microphone or any other type of air conduction sensor known to the skilled person) to be located outside the ear canals of the user, or to be located inside an ear canal of the user but arranged on the wearable device towards the exterior of the user's head.

For instance, if the audio system 10 is included in a pair of earbuds (one earbud for each ear of the user), then the internal sensor 11 is for instance arranged in a portion of one of the earbuds that is to be inserted in the user's ear, while the external sensor 12 is for instance arranged in a portion of one of the earbuds that remains outside the user's ears. It should be noted that, in some cases, the audio system 10 may comprise two or more internal sensors 11 (for instance one or two for each earbud) and/or two or more external sensors 12 (for instance one for each earbud).

As illustrated by FIG. 1, the audio system 10 comprises also a processing circuit 13 connected to the internal sensor 11 and to the external sensor 12. The processing circuit 13 is configured to receive and to process the audio signals produced by the internal sensor 11 and the external sensor 12.

In some embodiments, the processing circuit 13 comprises one or more processors and one or more memories. The one or more processors may include for instance a central processing unit (CPU), a graphical processing unit (GPU), a digital signal processor (DSP), a field-programmable gate array (FPGA), an application specific integrated circuit (ASIC), etc. The one or more memories may include any type of computer readable volatile and non-volatile memories (magnetic hard disk, solid-state disk, optical disk, electronic memory, etc.). The one or more memories may store a computer program product (software), in the form of a set of program-code instructions to be executed by the one or more processors in order to implement all or part of the steps of an audio signal processing method 20.

Figure 2:
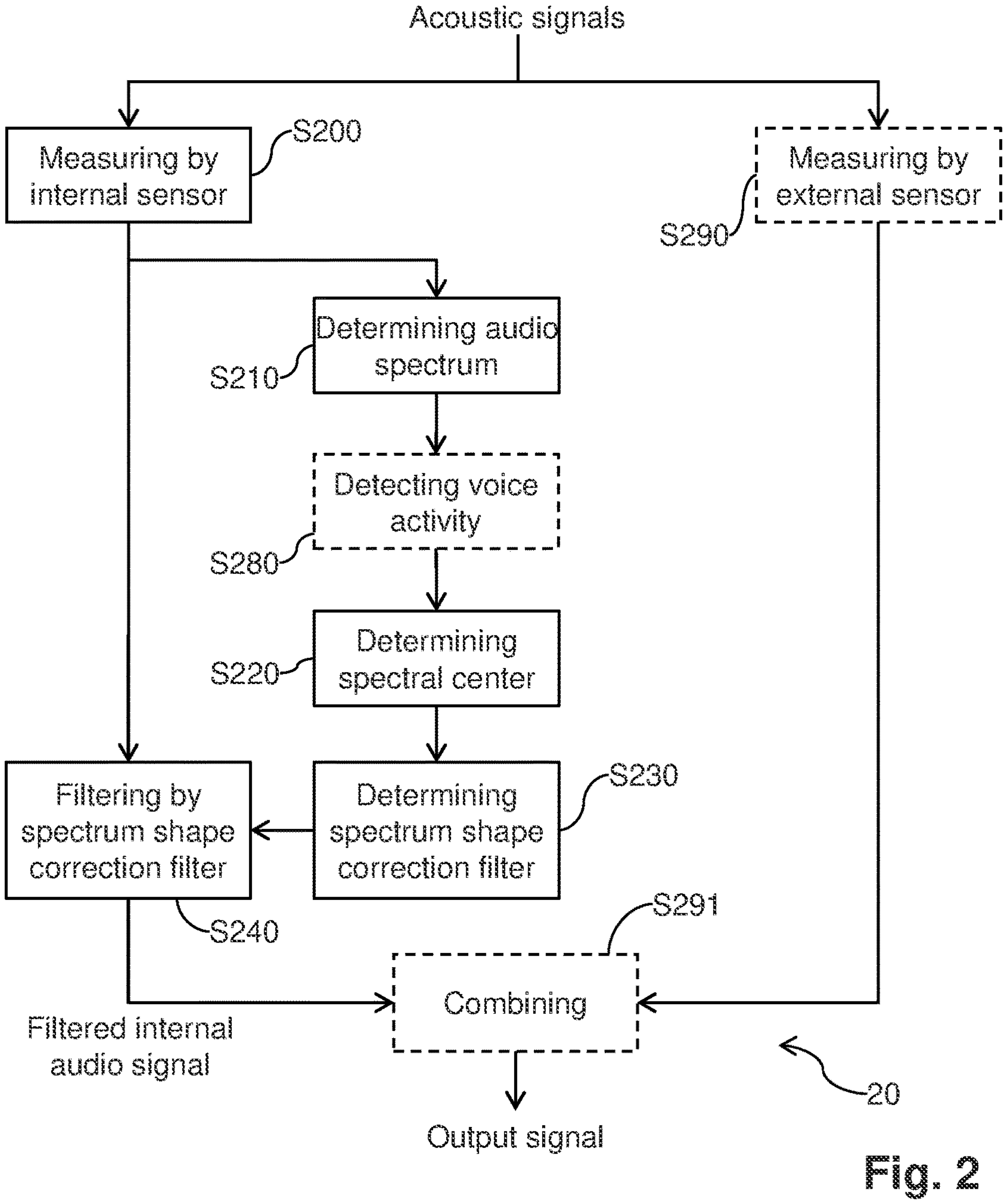
FIG. 2: a diagram representing the main steps of a first exemplary embodiment of an audio signal processing method.

FIG. 2 represents schematically the main steps of an exemplary embodiment of an audio signal processing method 20, which are carried out by the audio system 10.

As illustrated by FIG. 2, the audio signal processing method 20 comprises a step S200 of producing, by the internal sensor 11, an internal audio signal by measuring acoustic signals which reach the internal sensor 11. These acoustic signals may or may not include the voice of the user, with the presence of a voice activity varying over time as the user speaks.

As illustrated by FIG. 2, the audio signal processing method 20 comprises a step S210 of determining an audio spectrum of the internal audio signal, executed by the processing circuit 13. Indeed, the internal audio signal is in time domain and the step S210 aims at performing a spectral analysis of the internal audio signal to obtain an audio spectrum in frequency domain. In some examples, the step S210 may for instance use any time to frequency conversion method, for instance a fast Fourier transform (FFT), a discrete Fourier transform (DFT), a discrete cosine transform (DCT), a wavelet transform, etc. In other examples, the step S210 may for instance use a bank of bandpass filters which filter the internal audio signal in respective frequency sub-bands of a same frequency band, etc.

For instance, the internal audio signal may be sampled at e.g. 16 kilohertz (kHz) and buffered into time-domain frames of e.g. 4 milliseconds (ms). For instance, it is possible to apply on these frames a 128-point DCT or FFT to produce the audio spectrum up to the Nyquist frequency $f_{Nyquist}$, i.e. half the sampling rate (i.e. 8 kHz if the sampling rate is 16 kHz).

In the sequel, we assume in a non-limitative manner that the frequency band on which is determined the audio spectrum of the internal audio signal is composed of N discrete frequency values $f_n$ with $1 \leq n \leq N$, wherein $f_{min}=f_1$ corresponds to the minimum frequency and $f_{max}=f_N$ corresponds to the maximum frequency, and $f_{n-1}<f_n$ for any $2 \leq n \leq N$. For instance, $f_{min}=0$ and $f_{max}=f_{Nyquist}$, but the spectral analysis of the internal audio signal may also be carried out on a frequency sub-band in $[0, f_{Nyquist}]$. For instance, $f_{min}=0$ and $f_{max}$ is lower than or equal to 4000 Hz, or 3000 Hz, or 2000 Hz (for instance $f_{max}=1500$ Hz). It should be noted that the determination of the audio spectrum may be performed with any suitable spectral resolution. Also, the frequencies $f_n$ may be regularly spaced or irregularly spaced.

The audio spectrum $S_I$ of the internal audio signal $s_I$ corresponds to a set of values $\{S_I(f_n), 1 \leq n \leq N\}$. The audio spectrum $S_I$ is a magnitude spectrum such that $S_I(f_n)$ is representative of the power of the internal audio signal $s_I$ at the frequency $f_n$. For instance, if the audio spectrum is computed by an FFT, then $S_I(f_n)$ can correspond to $|FFT[s_I](f_n)|$ (i.e. modulus or absolute level of $FFT[s_I](f_n)$), or to $|FFT[s_I](f_n)|^2$ (i.e. power of $FFT[s_I](f_n)$), etc.

It should be noted that, in some embodiments, the audio spectrum can optionally be smoothed over time, for instance by using exponential averaging with a configurable time constant.

As illustrated by FIG. 2, the audio signal processing method 20 comprises a step S220 of determining, by the processing circuit 13, a spectral center of the audio spectrum.

Basically, the spectral center is a scalar value (a frequency value) representative of how the magnitude is distributed in the audio spectrum.

In preferred embodiments, the spectral center corresponds to a spectral centroid of the audio spectrum. Basically, the spectral centroid corresponds to a center of mass of the audio spectrum and may be calculated as a weighted sum of the frequencies present in the audio spectrum, weighted by their respective associated magnitudes given by the audio spectrum. With the above notations, the spectral centroid $f_{centroid}$ may be computed as:

$$f_{centroid} = \frac{\sum_{n=1}^{N} f_n S_I(f_n)}{\sum_{n=1}^{N} S_I(f_n)}$$

According to another example, the spectral center may be a spectral median of the audio spectrum. The spectral median corresponds to a frequency for which the sum of the magnitudes for frequencies below the spectral median is substantially equal to the sum of the magnitudes for frequencies above the spectral median. With discrete frequencies, the spectral median $f_{median}$ may be determined by finding the index k such that $$\sum_{n=1}^{k} S_I(f_n) \leq \sum_{n=k+1}^{k} S_I(f_n)$$

$$\sum_{n=1}^{k+1} S_I(f_n) > \sum_{n=k+2}^{k} S_I(f_n)$$

and the spectral median $f_{median}$ may for instance be set to $f_k$ or $f_{k+1}$.

Other examples are possible for the spectral center, as long as it is representative of how the magnitude is distributed in the audio spectrum. In the sequel, we assume in a non-limitative manner that the spectral center of the audio spectrum corresponds to the spectral centroid $f_{centroid}$.

It should be noted that, in some embodiments, the spectral centroid can optionally be smoothed over time, for instance by using exponential averaging with a configurable time constant.

As illustrated by FIG. 2, the audio signal processing method 20 comprises a step S230 of determining, by the processing circuit 13, a spectrum shape correction filter based on the spectral centroid $f_{centroid}$ (or more generally, the spectral center).

Indeed, as discussed above, the presence of a loosely fit earbud and/or of an active ANC unit results in a reduction in low frequency components due to a reduction of the occlusion effect (and possibly also in a boost of mid frequency components). Accordingly, the presence of a reduction of the occlusion effect will result in a greater value for the spectral centroid $f_{centroid}$ compared to an expected value of the spectral centroid $f_{centroid}$ with a tight fit of the earbud and an inactive ANC unit (or no ANC unit at all). The spectral centroid $f_{centroid}$ of the audio spectrum of the internal audio signal may therefore be used to evaluate a level of the occlusion effect in the internal audio signal compared to acoustic signals which propagate externally to the head of the user of the audio system 10, since the higher the spectral centroid $f_{centroid}$ the lower the occlusion effect.

Since the global effects of loose fitting and/or of an active ANC unit are known (reduction of low frequency components and possibly boost of mid frequency components), the spectral centroid $f_{centroid}$ can be used to determine a spectrum shape correction filter aiming at correcting these global effects. If the spectral centroid $f_{centroid}$ corresponds to an expected value (for the case with a tight fit and an inactive ANC unit), then the spectrum shape correction filter may be e.g. an identity filter (i.e. which does not modify the shape of the audio spectrum of the internal audio signal, which is identical to not applying the spectrum shape modification filter). If the spectral centroid $f_{centroid}$ corresponds to an unexpected value, then the spectrum shape correction filter may be configured to e.g. boost the low frequency components and possibly to reduce the middle/high frequency components of the internal audio signal.

For instance, the spectral centroid $f_{centroid}$ may be compared to one or more predetermined thresholds to evaluate the level of occlusion effect in the internal audio signal (which is representative of a fit quality level of the earbud). For instance, it is possible to consider a threshold $f_{TH1}$ between 200 Hertz (Hz) and 800 Hz, or between 300 Hz and 600 Hz, for instance equal to 400 Hz.

Hence, if the spectral centroid $f_{centroid}$ is lower than $f_{TH1}$, then the earbud may be considered to be tightly fit (and the ANC unit to be inactive). In that case, the spectrum shape correction filter may be an identity filter.

In turn, if the spectral centroid $f_{centroid}$ is greater than $f_{TH1}$, then the earbud may be considered to be loosely fit (or the ANC unit to be active). In that case, the spectrum shape correction filter may be configured to modify the audio spectrum of the internal audio signal to produce a modified audio spectrum having a modified spectral centroid $f'_{centroid}$ which is lower than the original spectral centroid $f_{centroid}$. Typically, the spectrum shape correction filter, in that case, applies greater gains for low frequency components than for middle/high frequency components of the audio spectrum.

It is also possible to use more than one threshold, to define different possible ranges for the spectral centroid $f_{centroid}$, related to different levels of occlusion effect (e.g. representative of different fit quality levels). For instance, it is possible to consider another threshold $f_{TH2}>f_{TH1}$ between 800 Hertz (Hz) and 1400 Hz, or between 900 Hz and 1200 Hz, for instance equal to 1000 Hz.

Hence, if the spectral centroid $f_{centroid}$ is lower than $f_{TH1}$, then the spectrum shape correction filter may be an identity filter, as discussed above.

If the spectral centroid $f_{centroid}$ is greater than $f_{TH1}$ and lower than $f_{TH2}$, then the earbud may be considered to be loosely fit (or the ANC unit to be active). In that case, the spectrum shape correction filter may be configured to modify the audio spectrum of the internal audio signal to reduce the spectral centroid. If the spectral centroid $f_{centroid}$ is greater than $f_{TH2}$, then the earbud may be considered to be extremely loosely fit. In that case, the spectrum shape correction filter is also configured to modify the audio spectrum of the internal audio signal to reduce the spectral centroid, but the expected shift of the spectral centroid needs to be greater than for the spectrum shape correction filter used when $f_{TH1}<f_{centroid}<f_{TH2}$. For instance, each spectrum shape correction filter which is not the identity filter should be configured to produce a modified audio spectrum having a modified spectral centroid $f'_{centroid}$ which is likely to be lower than the threshold $f_{TH1}$.

For instance, it is possible to define beforehand a plurality of different spectrum shape correction filters, associated respectively to different possible ranges of the spectral centroid. For instance, a first spectrum shape correction filter may be used when $f_{centroid}<f_{TH1}$ (identity filter), a second spectrum shape correction filter may be used when $f_{TH1}<f_{centroid}<f_{TH2}$, a third spectrum shape correction filter may be used when $f_{centroid}>f_{TH2}$, etc.

According to other examples, the spectrum shape correction filter may be adjusted dynamically to the audio spectrum to ensure that the modified spectral centroid $f'_{centroid}$ is lower than the threshold $f_{TH1}$. For instance, if $f_{centroid}<f_{TH1}$, the spectrum shape correction filter may be the identity filter. If $f_{centroid}>f_{TH1}$, then the spectrum shape correction filter may be adjusted dynamically to the audio spectrum to obtain a modified spectral centroid $f'_{centroid}$ that is lower than the threshold $f_{TH1}$. For instance, a plurality of candidate spectrum shape correction filters may be evaluated until a candidate spectrum shape correction filter, or a combination of cascaded candidate spectrum shape correction filters, such that $f'_{centroid}<f_{TH1}$ is found.

As illustrated by FIG. 2, the audio signal processing method 20 then comprises a step S240 of filtering the internal audio signal by using the spectrum shape correction filter, thereby producing a filtered internal audio signal. As discussed above, depending on the spectral centroid $f_{centroid}$ (or more generally the spectral center), the spectrum shape correction filter may be the identity filter such that the internal audio signal is not modified.

In a conventional manner, the internal audio signal may be filtered by the spectrum shape correction in time domain, by using a time-domain spectrum shape correction filter applied directly on the time-domain internal audio signal, or in frequency domain, by using a frequency domain spectrum shape correction filter applied to a frequency-domain internal audio signal.

Hence, the spectrum shape correction filter to be applied for fit compensation can be designed in multiple ways, using time-domain infinite impulse response, IIR, and finite impulse response, FIR, filters, frequency-domain weights, or a combination of both techniques. For instance, a blend of flat gain, low-pass, high-pass, band-pass, peaking, low-shelf and high-shelf filters can be used depending on how the audio spectrum is affected by the earbud fit and/or by the active ANC unit and the correction needed.

In FIG. 2, a time-domain spectrum shape correction filter is applied to the time-domain internal audio signal. For instance, the spectrum shape correction filter may be a low-shelf filter with positive gain at a cut-off frequency e.g. 10 dB at 400 Hz. Such a spectrum shape correction filter can re-balance the low frequency components, but the middle/high frequency components are not affected. On the other hand, a more optimal spectrum shape compensation filter may be obtained by using a set of two (of more) cascaded bi-quad filters, wherein the first set of bi-quad filter coefficients may be configured to act as a low-shelf filter with positive gain at a particular cut-off frequency to boost the low frequency components, and the second set of bi-quad filter coefficients may be configured to act as a high-shelf filter with the same cut-off as the low-shelf filter, except with a negative gain to attenuate the middle/high frequency components.

Figure 3:
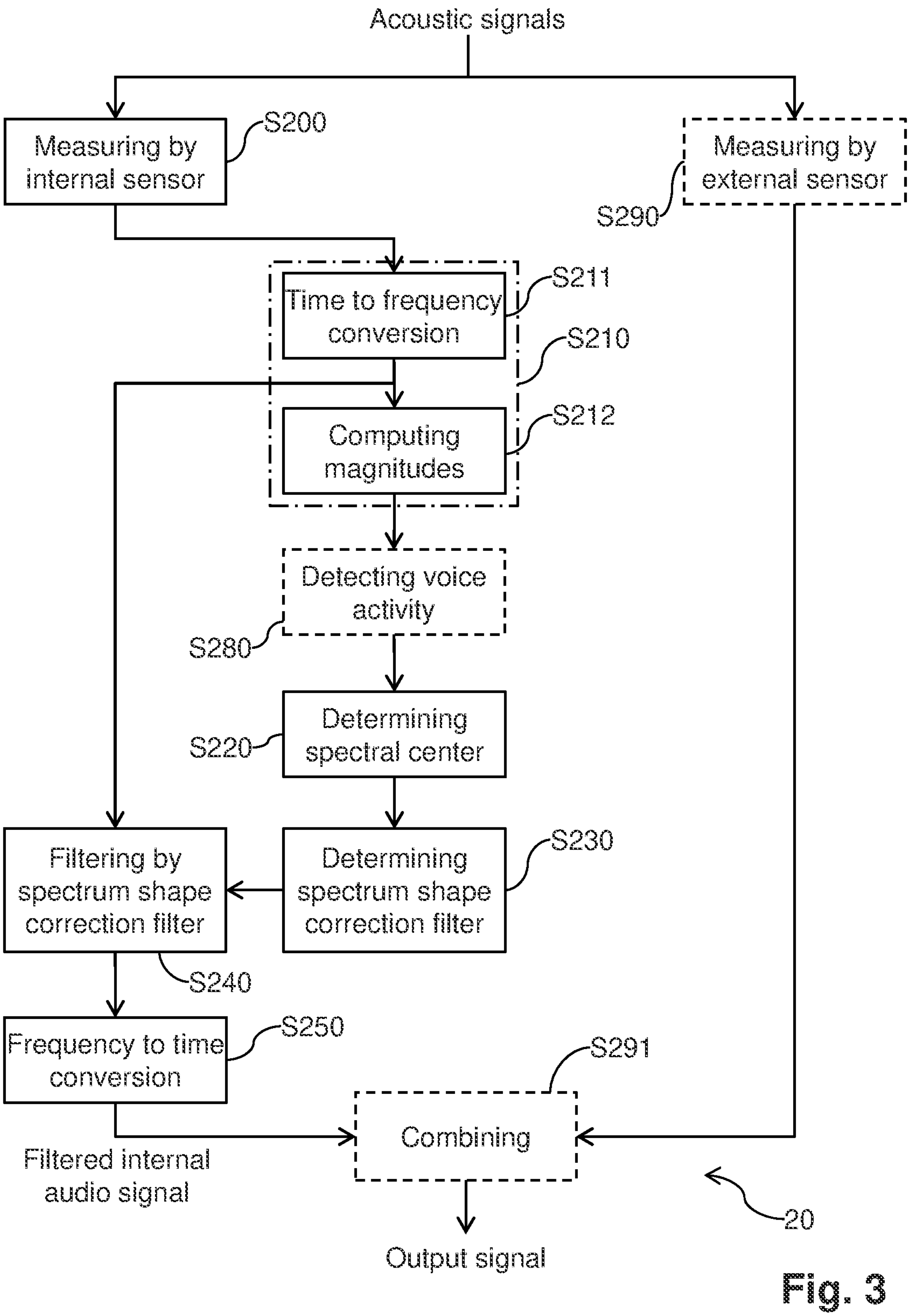
FIG. 3: a diagram representing the main steps of a second exemplary embodiment of the audio signal processing method.

FIG. 3 represents schematically the main steps of an exemplary embodiment of the audio signal processing method 20 in which a frequency-domain spectrum shape correction filter is applied to a frequency-domain internal audio signal. As illustrated in FIG. 3, the step S210 of determining the audio spectrum comprises in this example a step S211 of converting the time-domain internal audio signal into a frequency-domain internal audio signal and a step S212 of computing the magnitudes of the frequency-domain internal audio signal which produces the audio spectrum. For instance, if the time to frequency conversion uses an FFT, then the frequency-domain internal audio signal corresponds to the set of values $\{FFT[s_I](f_n), 1\leq n\leq N\}$. The audio spectrum $S_I$ corresponds to the magnitudes of the frequency-domain internal audio signal $\{|FFT[s_I](f_n)|, 1\leq n\leq N\}$. The frequency-domain spectrum shape correction filter H corresponds then to a set of frequency-domain weights $\{H(f_n), 1\leq n\leq N\}$ which may be predetermined or adjusted dynamically to the audio spectrum to shift the spectral centroid $f_{centroid}$ below $f_{TH1}$. The result of the filtering of the internal audio signal by the spectrum shape correction filter, in frequency-domain, corresponds to the set $\{H(f_n)\times FFT[s_I](f_n), 1\leq n\leq N\}$. As illustrated by FIG. 3, the audio signal processing method 20 comprises in this embodiment a step S250 of converting the frequency-domain filtered internal audio signal to time domain, by the processing circuit 13.

Figure 4:
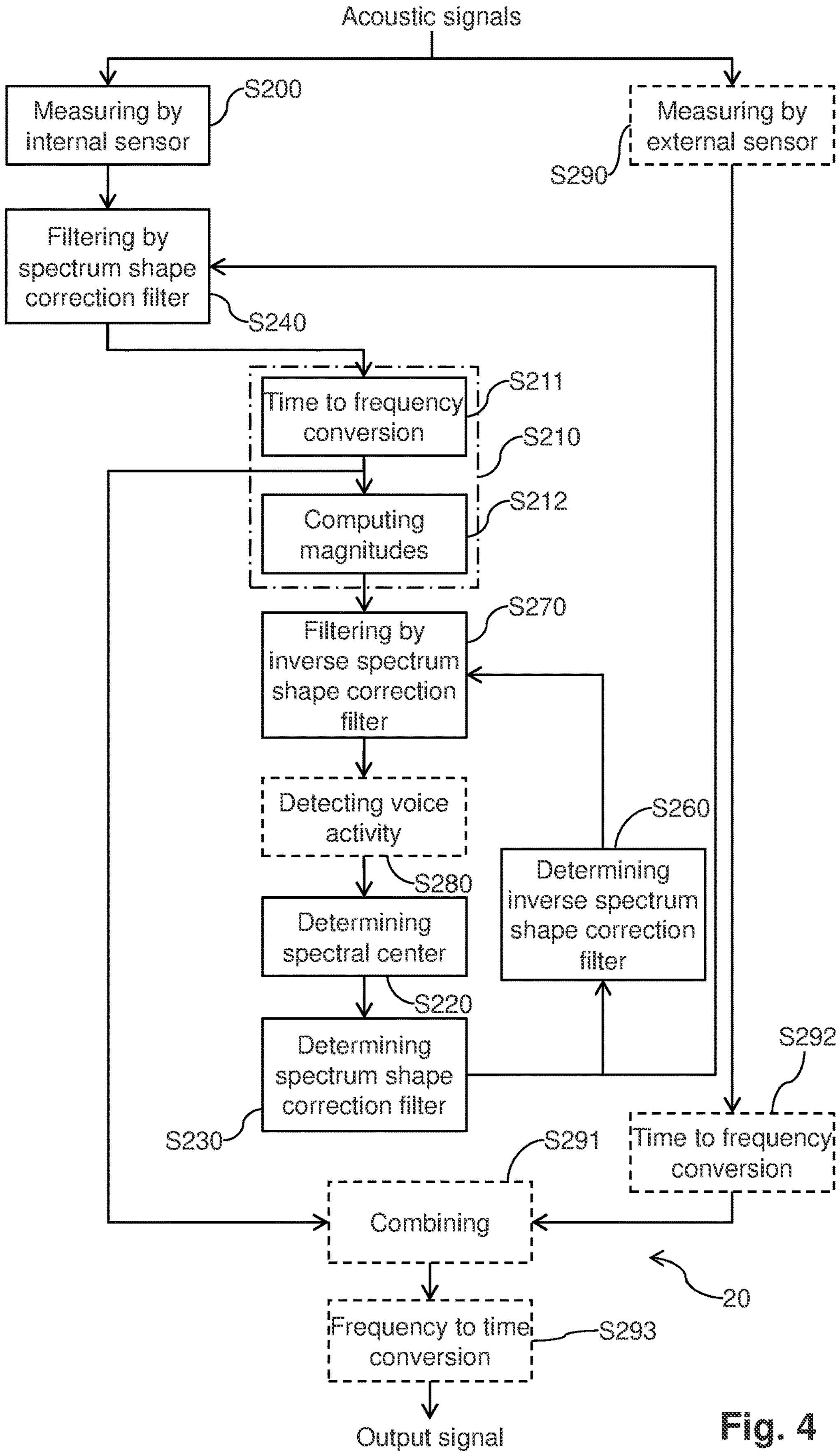
FIG. 4: a diagram representing the main steps of a third exemplary embodiment of an audio signal processing method.

FIG. 4 represents schematically the main steps of another exemplary embodiment of the audio signal processing method 20. In the example illustrated by FIG. 4, the spectrum shape correction filter is applied in time-domain, however it can also be applied in frequency-domain in other examples.

As illustrated by FIG. 4, the step S240 of filtering the internal audio signal by using the spectrum shape correction filter is executed on the internal audio signal before determining its spectral centroid (and before computing its audio spectrum in this example). Basically, the internal audio signal comprises a plurality of successive audio frames and the spectrum shape correction filter determined by processing a previous audio frame (or a plurality of previous audio frames if e.g. the spectrum shape correction filter is smoothed over a plurality of successive audio frames) of the internal audio signal is applied to a current audio frame before determining the spectral center for the current audio frame. Applying the spectrum shape correction filter in time domain and early in the processing chain may for instance be useful if other processing algorithms (not represented in the figures, such as e.g. VAD and/or automatic gain control, AGC) are performed in time domain, and if most subsequent steps of the audio signal processing method 20 are performed in frequency domain. Of course, if a spectrum shape correction filter (determined for the one or more previous audio frames) has already been applied beforehand to the current audio frame of the internal audio signal, it modifies the spectral centroid (except if the spectrum shape correction filter is the identity filter). If the spectrum shape correction filter is not the identity filter, this needs to be compensated for before computing the spectral centroid for the current audio frame. In that case, the audio signal processing method 20 comprises a step S260 of determining an inverse of the spectrum shape correction filter determined by processing the one or more previous audio frames and a step S270 of filtering the current audio frame by the inverse spectrum shape correction filter before determining the spectral centroid for the current audio frame, both executed by the processing circuit 13. In the example illustrated by FIG. 4, the filtering by the inverse spectrum shape correction filter is performed in frequency-domain, on the audio spectrum, however it can also be performed in time-domain in other examples.

In preferred embodiments, and as illustrated by FIGS. 2, 3 and 4, the audio signal processing method 20 further comprises an optional step S280 of evaluating a voice activity in the internal audio signal and. When no voice activity is detected in the internal audio signal, then the spectrum shape correction filter is not modified, i.e. the spectrum shape correction filter used during the previous audio frame is reused for the current audio frame. Indeed, if the internal audio signal does not include voice, then the spectral centroid might not behave as expected. Hence, the spectrum shape correction filter should preferably be modified only when the spectral centroid is determined based on an internal audio signal including voice, since the computation of the spectral centroid is more robust in that case. Such a voice activity detection may be carried out in a conventional manner using any voice activity detection method known to the skilled person. Preferably, a simple voice activity detector may be implemented by computing the power in a particular sub-band e.g. 600 Hz-1500 Hz and comparing it with a predefined threshold to obtain a crude estimate of speech/own-voice versus noise-only regions. Due to the nature of different phonemes in speech, it can be advantageous, in some cases, to smooth the spectral centroid over time, e.g. by using an exponential smoothing with a configurable time constant.

Hence, the proposed audio signal processing method 20 enhances the internal audio signal in the presence of a loosely fit earbud and/or an active ANC unit, by filtering the internal audio signal by a spectrum shape correction filter. Hence, as such, the filtered internal audio signal may be used to improve the performance of different applications, including the applications which may use only the internal audio signal from the internal sensor 11 (e.g. speech recognition, VAD, speech level estimation, etc.).

In some embodiments, it is also possible to combine the filtered internal audio signal with an external audio signal produced by the external sensor 12. In such a case, and as illustrated by FIGS. 2, 3 and 4, the audio signal processing method 20 further comprises an optional step S290 of producing the external audio signal by the external sensor 12 by measuring acoustic signals reaching said external sensor 12 (simultaneously with step S200) and an optional step S291 of producing an output signal by combining the external audio signal with the filtered internal audio signal, both executed by the processing circuit 13. For instance, the output signal is obtained by using the filtered internal audio signal below a cutoff frequency and using the external audio signal above the cutoff frequency. Typically, the output signal may be obtained by:

- low-pass filtering the filtered internal audio signal based on the cutoff frequency,
- high-pass filtering the external audio signal based on the cutoff frequency,
- adding the respective results of the low-pass filtering of the filtered internal audio signal and of the high-pass filtering of the external audio signal to produce the output signal.

It should be noted that the combining of the external audio signal with the filtered internal audio signal may be performed in time domain or in frequency domain. In the examples illustrated by FIGS. 2 and 3, the combining step S291 is performed in time domain. In the example illustrated by FIG. 4, the combining step S291 is performed in frequency domain, and the audio signal processing method 20 comprises in this example a step S292 of converting the external audio signal to frequency domain before the combining step S291, and a step S293 of converting the output of the combining step S291 to time domain which produces the output signal in time domain.

For instance, the cutoff frequency may be a static frequency, which is preferably selected beforehand in the frequency band in which the audio spectrum of the internal audio signal is computed.

According to another example, the cutoff frequency may be dynamically adapted to the actual noise conditions. For instance, the setting of the cutoff frequency may use the method described in U.S. patent application Ser. No. 17/667,041, filed on Feb. 8, 2022, the contents of which are hereby incorporated by reference in its entirety.

It is emphasized that the present disclosure is not limited to the above exemplary embodiments. Variants of the above exemplary embodiments are also within the scope of the present invention.

The above description clearly illustrates that by its various features and their respective advantages, the present disclosure reaches the goals set for it.

Indeed, by computing a spectral center of the audio spectrum of the internal audio signal, it is possible to detect a loosely fit earbud and/or an active ANC unit, and to configure a spectrum shape correction filter accordingly. While the present disclosure is particularly advantageous for compensating for loosely fit earbuds, it is also advantageous for compensating for active ANC units. Indeed, it might not be possible to obtain the information on whether the ANC unit is active or inactive from said ANC unit, and the spectral center can also be used to detect that the ANC unit is likely to be active, even if the spectral center alone does not enable to differentiate the effects of a loosely fit earbud from the effects of an active ANC unit.

The invention claimed is:

1. An audio signal processing method implemented by an audio system which comprises at least an internal sensor, wherein the internal sensor corresponds to an air conduction sensor or a bone conduction sensor located in an ear canal of a user of the audio system and arranged to measure acoustic signals which propagate internally to a head of the user, and an external sensor arranged to measure acoustic signals that propagate externally to the user's head, the audio signal processing method comprising:

- producing an internal audio signal by the internal sensor, wherein the internal sensor is a microphone or an accelerometer;
- producing an external audio signal by the external sensor, wherein the external sensor is a microphone;
- determining an audio spectrum of the internal audio signal;
- determining a spectral center of the audio spectrum;
- determining whether the spectral center exceeds a predetermined threshold between 200 Hertz and 800 Hertz, wherein exceeding the predetermined threshold indicates a reduced occlusion effect due to at least one of a loose fit of the audio system in the ear canal or an active noise cancellation unit;
- determining a spectrum shape correction filter based on the spectral center, wherein:
  - when the spectral center does not exceed the predetermined threshold, configuring the spectrum shape correction filter as an identity filter that does not modify the audio spectrum, and
  - when the spectral center exceeds the predetermined threshold, configuring the spectrum shape correction filter to boost low frequency components below 600 Hertz to compensate for the reduced occlusion effect;
- filtering the internal audio signal by using the spectrum shape correction filter, thereby producing a filtered internal audio signal; and
- producing an output signal by combining the external audio signal with the filtered internal audio signal.

2. The audio signal processing method according to claim 1, wherein the spectral center is a spectral centroid or a spectral median of the audio spectrum.

3. The audio signal processing method according to claim 1, further comprising:

- evaluating a voice activity in the internal audio signal and,
- responsive to no voice activity being detected in the internal audio signal, not applying or not modifying the spectrum shape correction filter.

4. The audio signal processing method according to claim 1, wherein determining the spectrum shape correction filter comprises selecting, based on the spectral center, a spectrum shape correction filter among a plurality of predetermined different spectrum shape correction filters.

5. The audio signal processing method according to claim 1, wherein:

the internal audio signal comprises a plurality of successive audio frames, the spectrum shape correction filter determined by processing one or more previous audio frames of the internal audio signal is applied to a current audio frame before determining the spectral center for the current audio frame, and the audio signal processing method further comprises determining an inverse spectrum shape correction filter of the spectrum shape correction filter determined by processing the one or more previous audio frames and filtering the current audio frame by the inverse spectrum shape correction filter before determining the spectral center for the current audio frame.

6. The audio signal processing method according to claim 1, wherein filtering the internal audio signal is performed by applying the spectrum shape correction in time domain or in frequency domain.

7. An audio system comprising at least an internal sensor, wherein the internal sensor corresponds to an air conduction sensor or a bone conduction sensor to be located in an ear canal of a user of the audio system and arranged to measure acoustic signals which propagate internally to a head of the user, wherein the internal sensor is a microphone or an accelerometer and is configured to produce an internal audio signal, and an external sensor arranged to measure acoustic signals that propagate externally to the user's head and produce an external audio signal, wherein the external sensor is a microphone, and wherein said audio system further comprises a processing circuit configured to:

determine an audio spectrum of the internal audio signal;

determine a spectral center of the audio spectrum;

determine whether the spectral center exceeds a predetermined threshold between 200 Hertz and 800 Hertz, wherein exceeding the predetermined threshold indicates a reduced occlusion effect due to at least one of a loose fit of the audio system in the ear canal or an active noise cancellation unit;

determine a spectrum shape correction filter based on the spectral center, wherein:

when the spectral center does not exceed the predetermined threshold, configure the spectrum shape correction filter as an identity filter that does not modify the audio spectrum, and when the spectral center exceeds the predetermined threshold, configure the spectrum shape correction filter to boost low frequency components below 600 Hertz to compensate for the reduced occlusion effect;

filter the internal audio signal by using the spectrum shape correction filter, thereby producing a filtered internal audio signal; and producing an output signal by combining the external audio signal with the filtered internal audio signal.

8. The audio system according to claim 7, wherein the spectral center is a spectral centroid or a spectral median of the audio spectrum.

9. The audio system according to claim 7, wherein the processing circuit is further configured to:

evaluate a voice activity in the internal audio signal and, responsive to no voice activity being detected in the internal audio signal, not applying or not modifying the spectrum shape correction filter.

10. The audio system according to claim 7, wherein the processing circuit is configured to determine the spectrum shape correction filter by selecting, based on the spectral center, a spectrum shape correction filter among a plurality of predetermined different spectrum shape correction filters.

11. The audio system according to claim 7, wherein:

the internal audio signal comprises a plurality of successive audio frames, the spectrum shape correction filter determined by processing a one or more previous audio frames of the internal audio signal is applied to a current audio frame before determining the spectral center for the current audio frame, and the processing circuit is further configured to determine an inverse spectrum shape correction filter of the spectrum shape correction filter determined by processing the one or more previous audio frames and to filter the current audio frame by the inverse spectrum shape correction filter before determining the spectral center for the current audio frame.

12. The audio system according to claim 7, wherein filtering the internal audio signal is performed by applying the spectrum shape correction in time domain or in frequency domain.

13. The audio system according to claim 7, further comprising an external sensor arranged to measure acoustic signals which propagate externally to the user's head, wherein the external sensor is configured to produce an external audio signal, wherein the processing circuit is further configured to produce an output signal by combining the external audio signal with the filtered internal audio signal.

14. A non-transitory computer readable medium comprising computer readable code to be executed by an audio system comprising at least an internal sensor, wherein the internal sensor corresponds to a microphone or an accelerometer to be located in an ear canal of a user of the audio system and arranged to measure acoustic signals which propagate internally to a head of the user, wherein said audio system further comprises a processing circuit, and an external sensor arranged to measure acoustic signals that propagate externally to the user's head, wherein the external sensor is a microphone, and wherein said computer readable code causes said audio system to:

produce an internal audio signal by the internal sensor;

produce an external audio signal by the external sensor;

determine an audio spectrum of the internal audio signal;

determine a spectral center of the audio spectrum;

determine whether the spectral center exceeds a predetermined threshold between 200 Hertz and 800 Hertz, wherein exceeding the predetermined threshold indicates a reduced occlusion effect due to at least one of a loose fit of the audio system in the ear canal or an active noise cancellation unit;

determine a spectrum shape correction filter based on the spectral center, wherein:

when the spectral center does not exceed the predetermined threshold, configure the spectrum shape correction filter as an identity filter that does not modify the audio spectrum, and when the spectral center exceeds the predetermined threshold, configure the spectrum shape correction filter to boost low frequency components below 600 Hertz to compensate for the reduced occlusion effect;

filter the internal audio signal by using the spectrum shape correction filter, thereby producing a filtered internal audio signal; and produce an output signal by combining the external audio signal with the filtered internal audio signal.

15. The non-transitory computer readable medium of claim 14, wherein the spectral center is a spectral centroid or a spectral median of the audio spectrum.

16. The non-transitory computer readable medium of claim 14, wherein the processing circuit is further configured to:

evaluate a voice activity in the internal audio signal and, responsive to no voice activity being detected in the internal audio signal, not applying or not modifying the spectrum shape correction filter.

17. The non-transitory computer readable medium of claim 14, wherein the processing circuit is configured to determine the spectrum shape correction filter by selecting, based on the spectral center, a spectrum shape correction filter among a plurality of predetermined different spectrum shape correction filters.

18. The non-transitory computer readable medium of claim 14, wherein:

the internal audio signal comprises a plurality of successive audio frames, the spectrum shape correction filter determined by processing a one or more previous audio frames of the internal audio signal is applied to a current audio frame before determining the spectral center for the current audio frame, and the processing circuit is further configured to determine an inverse spectrum shape correction filter of the spectrum shape correction filter determined by processing the one or more previous audio frames and to filter the current audio frame by the inverse spectrum shape correction filter before determining the spectral center for the current audio frame.

19. The non-transitory computer readable medium of claim 14, wherein filtering the internal audio signal is performed by applying the spectrum shape correction in time domain or in frequency domain.

20. The non-transitory computer readable medium of claim 14, further comprising an external sensor arranged to measure acoustic signals which propagate externally to the user's head, wherein the external sensor is configured to produce an external audio signal, wherein the processing circuit is further configured to produce an output signal by combining the external audio signal with the filtered internal audio signal.

* * * * *